US012785983B2

(12) United States Patent
Ben Henda et al.

(10) Patent No.: US 12,785,983 B2
(45) Date of Patent: Nov. 3, 2026

(54) CRYPTOGRAPHIC SECURITY MECHANISM FOR GROUPCAST COMMUNICATION

(71) Applicant: Telefonaktiebolaget LM Ericsson (publ), Stockholm (SE)

(72) Inventors: Noamen Ben Henda, Vällingby (SE); Markus Hanhisalo, Espoo (FI); Monica Wifvesson, Lund (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 267 days.

(21) Appl. No.: 17/765,183

(22) PCT Filed: Oct. 5, 2020

(86) PCT No.: PCT/EP2020/077813
§ 371 (c)(1),
(2) Date: Mar. 30, 2022

(87) PCT Pub. No.: WO2021/069359
PCT Pub. Date: Apr. 15, 2021

(65) Prior Publication Data

US 2022/0393877 A1 Dec. 8, 2022

Related U.S. Application Data

(60) Provisional application No. 62/911,582, filed on Oct. 7, 2019.

(51) Int. Cl.

| | |
|---|---|
| ***H04W 12/02*** | (2009.01) |
| ***H04L 9/32*** | (2006.01) |
| ***H04L 9/40*** | (2022.01) |

(52) U.S. Cl.
CPC ........ *H04L 9/3239* (2013.01); *H04L 63/0414* (2013.01); *H04W 12/02* (2013.01); *H04L 2209/42* (2013.01)

(58) Field of Classification Search
CPC ..................................................... H04W 12/02
See application file for complete search history.

(56) References Cited

U.S. PATENT DOCUMENTS

| | | | | |
|---|---|---|---|---|
| 11,825,560 | B2 * | 11/2023 | Panteleev | H04W 72/20 |
| 12,047,961 | B2 * | 7/2024 | Li | H04W 76/16 |
| 12,052,200 | B2 * | 7/2024 | Sun | H04L 5/0055 |

(Continued)

OTHER PUBLICATIONS

NEC, "New solution for privacy protection for groupcast and broadcast communications over PC5", 3GPP TSG SA WG3 (Security) Meeting #96, Aug. 26-30, 2019, pp. 1-4, Wroclaw, Poland, S3-192570. (Year: 2019).*

(Continued)

*Primary Examiner* — Zachary A. Davis
(74) *Attorney, Agent, or Firm* — COATS & BENNETT, PLLC

(57) ABSTRACT

The present disclosure provides a security mechanism to mitigate the risk of trackability of a UE engaged in groupcast communication. The security mechanism makes use of cryptographic functions and thus provides a cryptographic-grade protection for groupcast communications. The security mechanism can be implemented without any additional signaling for even additional parameters in existing signaling message.

20 Claims, 12 Drawing Sheets

(56) References Cited

U.S. PATENT DOCUMENTS

2015/0312953 A1* 10/2015 Wang .................... H04L 1/1864
370/312

OTHER PUBLICATIONS

3rd Generation Partnership Project, "Technical Specification Group Services and System Aspects; Study on Security Aspects of 3GPP support for Advanced V2X Services (Release 16)", 3GPP TR 33.836 v0.3.0, Aug. 1, 2019, pp. 1-36.
3rd Generation Partnership Project, "Technical Specification Group Services and System Aspects; Architecture enhancements for 5G System (5GS) to support Vehicle-to-Everything (V2X) services (Release 16)", 3GPP TS 23.287 v1.1.0, Jul. 1, 2019, pp. 1-50.
NEC, "New solution for privacy protection for groupcast and broadcast communications over PC5", 3GPP TSG SA WG3 (Security) Meeting #96, Aug. 26-30, 2019, pp. 1-4, Wroclaw, Poland, S3-192570.
3rd Generation Partnership Project, "Technical Specification Group Services and System Aspects; Procedures for the 5G System (5GS); Stage 2 (Release 16)", 3GPP TS 23.502 v16.2.0, Sep. 1, 2019, pp. 1-525.
3rd Generation Partnership Project, Technical Specification Group Services and System Aspects; System Architecture for the 5G System (5GS); Stage 2 (Release 16), 3GPP TS 23.501 v16.2.0, Sep. 1, 2019, pp. 1-391.
3rd Generation Partnership Project, "Technical Specification Group Services and System Aspects; Security architecture and procedures for 5G system (Release 16)", 3GPP TS 33.501 v16.0.0, Sep. 1, 2019, pp. 1-196.
3rd Generation Partnership Project, "Technical Specification Group Services and System Aspects; Policy and Charging Control Framework for the 5G System (5GS); Stage 2 (Release 16)", 3GPP TS 23.503 v16.2.0, Sep. 1, 2019, pp. 1-104.
3rd Generation Partnership Project, "Technical Specification Group Services and System Aspects; Security aspect for LTE support of Vehicle-to-Everything (V2X) services (Release 15)", 3GPP TS 33.185 v15.0.0, Jun. 1, 2018, pp. 1-10.
3rd Generation Partnership Project, "Technical Specification Group Services and System Aspects; Architecture enhancements for 5G System (5GS) to support Vehicle-to-Everything (V2X) services (Release 16)", 3GPP TS 23.287 v16.0.0, Sep. 1, 2019, pp. 1-49.

* cited by examiner

CRYPTOGRAPHIC SECURITY MECHANISM FOR GROUPCAST COMMUNICATION

TECHNICAL FIELD

The present disclosure relates generally to device-to-device (D2D) communications and, more particularly to security measures for groupcast messages in D2D communications.

BACKGROUND

The Third Generation Partnership Project (3GPP) security standardization working group SA3 has finalized the security specification for the Release 15 of the Fifth Generation (5G) System in TS 33.501. The 5G System, also known as New Radio (NR), includes many new features that require the introduction of new security mechanisms. For example, the 5G System integrates non-3GPP access (e.g., Wireless Local Area Network (WLAN)) alongside 3GPP access (e.g., NR and Long Term Evolution (LTE)) in a seamless manner. More precisely, in 5G, a user equipment (UE) can run the usual service access procedure independently of the underlying access.

Currently, there is an ongoing study in the 3GPP SA3 working group looking into the security issues and solutions for the support of Vehicle-to-Everything (V2X) in 5G Systems. The study is being documented in TR 33.836. Among the key issues identified, a few are related to privacy for communication over the PC5 interface. Among the key issues being discussed are the threats from the disclosure of the Layer 2 (L2) identifiers over the PC5 interface and the risk that an eavesdropper can track UEs based on the L2 identifiers.

A mitigation strategy against exposure of the L2 identifiers is described in TS 33.185. This mitigation strategy is used in the Evolved Packet System (EPS) implementation of V2X. The standard requires the UE to regularly refresh the L2 identifiers and assign their values randomly. It is also specified that identifiers in the application layer and the lower layers (e.g., L2) be changed simultaneously. Thus, the application layer must indicate to the lower layers when such identifiers change. It should be noted that the implementation of V2X in EPS includes only broadcast type communication over PC5. The destination L2 identifiers in broadcast communication are fixed depending on the type of application and are not UE-specific. For this reason, it was deemed that the privacy mechanism described above is only needed for the source L2 identifiers on the sender side.

The implementation of V2X in 5G includes support for groupcast communication. It is not clear whether the existing privacy protection mechanism intended for broadcast communication will work for groupcast communication. As described in TS 23.287, the destination L2 identifiers may be group-specific. Consequently, using the same destination L2 identifier during group communication by the same UE can be used by an eavesdropper to track the UE. This threat is mitigated by the legacy mechanism, i.e., UE changing it is source Layer 2 ID, but is not completely removed. It is still possible for an attacker observing a large enough set of groupcast messages pertaining to the same group to undermine the privacy protection. More particularly, the attacker can identify that a given message is destined to a particular group and thus infer that the source UE is a member of a particular group. In other terms, the attacker can identify and track group members but cannot track a single fixed member since as soon as the member changes the source L2 identifier, the linkage is broken.

SUMMARY

The present disclosure provides a security mechanism to mitigate the risk of trackability of a UE (e.g., V2X device) engaged in groupcast communication over a sidelink. The security mechanism makes use of cryptographic functions and thus provides a cryptographic-grade protection for groupcast communications. The security mechanism can be implemented without any additional signaling for even additional parameters in existing signaling message.

The security mechanism for concealing group identifier as herein described does not require additional signaling or inclusion of additional parameters in existing signaling messages. The security protocol mitigates against the UE tracking threat when engaging in groupcast communication. The security protocol reuses the legacy mechanism for source L2 Identifier privacy protection, while, providing cryptographic-level strength in the sense that the attacker needs to break a cryptographic function in order to undermine the protection mechanism.

A first aspect of the disclosure comprises methods implemented by a UE configured for groupcast communication with members of a device group. The method comprises hashing a group identifier and source identifier of a sending device to generate a pseudorandom value, generating a pseudorandom destination identifier based on the pseudorandom value and a preconfigured conversion function, and sending a groupcast message targeted to the device group, the groupcast message including the pseudorandom destination identifier and the source identifier.

A second aspect of the disclosure comprises a UE configured for groupcast communication with members of a device group. The UE is configured to hash a group identifier and source identifier of a sending device to generate a pseudorandom value, generate a pseudorandom destination identifier based on the pseudorandom value and a preconfigured conversion function, and send a groupcast message targeted to the device group, the groupcast message including the pseudorandom destination identifier and the source identifier.

A third aspect of the disclosure comprises a UE configured for groupcast communication with members of a device group. The UE comprises an interface circuit configured for device-to-device communication over a sidelink, and processing circuitry configured to hash a group identifier and source identifier of a sending device to generate a pseudorandom value, generate a pseudorandom destination identifier based on the pseudorandom value and a preconfigured conversion function, and send a groupcast message targeted to the device group, the groupcast message including the pseudorandom destination identifier and the source identifier.

A fourth aspect of the disclosure comprises a computer program comprising executable instructions that, when executed by a processing circuit in a UE, causes the UE to perform the method according to the first aspect.

A fifth of the disclosure comprises a carrier containing a computer program according to the fourth aspect, wherein the carrier is one of an electronic signal, optical signal, radio signal, or computer readable storage medium.

A sixth aspect of the disclosure comprises methods implemented by a UE configured for groupcast communication with members of a device group. The method comprises receiving a groupcast message intended for the device group, the groupcast message including a destination identifier and a source identifier of the sending device, hashing a group identifier and the source identifier in the received groupcast message to generate a pseudorandom value, generating a predicted pseudorandom destination identifier based on the pseudo random value and a preconfigured conversion function, and handling the message based on a comparison of the predicted pseudorandom destination identifier and destination identifier in the received groupcast message.

A seventh aspect of the disclosure comprises a UE configured for groupcast communication with members of a device group. The UE is configured to receive a groupcast message intended for the device group, the groupcast message including a destination identifier and a source identifier of the sending device, hash a group identifier and the source identifier in the received groupcast message to generate a pseudorandom value, generate a predicted pseudorandom destination identifier based on the pseudo random value and a preconfigured conversion function, and handle the message based on a comparison of the predicted pseudorandom destination identifier and destination identifier in the received groupcast message.

An eighth aspect of the disclosure comprises a UE configured for groupcast communication with members of a device group. The UE comprises an interface circuit configured for device-to-device communication over a sidelink, and processing circuitry configured to receive a groupcast message intended for the device group, the groupcast message including a destination identifier and a source identifier of the sending device, hash a group identifier and the source identifier in the received groupcast message to generate a pseudorandom value, generate a predicted pseudorandom destination identifier based on the pseudo random value and a preconfigured conversion function, and handle the message based on a comparison of the predicted pseudorandom destination identifier and destination identifier in the received groupcast message A ninth aspect of the disclosure comprises a computer program comprising executable instructions that, when executed by a processing circuit in a UE, causes the UE to perform the method according to the sixth aspect.

A tenth of the disclosure comprises a carrier containing a computer program according to the ninth aspect, wherein the carrier is one of an electronic signal, optical signal, radio signal, or computer readable storage medium.

An eleventh aspect of the disclosure comprises methods implemented by a UE configured for groupcast communication with members of a device group. The method comprises hashing a group identifier and source identifier of a sending device to generate an intermediate destination L2 identifier, generating a cryptographic destination identifier based on the intermediate destination L2 identifier value and a preconfigured conversion function; and sending, to the device group, a groupcast message including the cryptographic destination identifier and the source identifier.

A twelfth aspect of the disclosure comprises a UE configured for groupcast communication with members of a device group. The UE is configured to hash a group identifier and source identifier of a sending device to generate an intermediate destination L2 identifier, generate a cryptographic destination identifier based on the intermediate destination L2 identifier value and a preconfigured conversion function and send, to the device group, a groupcast message including the cryptographic destination identifier and the source identifier.

A thirteenth aspect of the disclosure comprises a UE configured for groupcast communication with members of a device group. The UE comprises an interface circuit configured for device-to-device communication over a sidelink, and processing circuitry configured to hash a group identifier and source identifier of a sending device to generate an intermediate destination L2 identifier, generate a cryptographic destination identifier based on the intermediate destination L2 identifier value and a preconfigured conversion function and send, to the device group, a groupcast message including the cryptographic destination identifier and the source identifier.

A fourteenth aspect of the disclosure comprises a computer program comprising executable instructions that, when executed by a processing circuit in a UE, causes the UE to perform the method according to the eleventh aspect.

A fifteenth of the disclosure comprises a carrier containing a computer program according to the fourth aspect, wherein the carrier is one of an electronic signal, optical signal, radio signal, or computer readable storage medium.

A sixteenth aspect of the disclosure comprises methods implemented by a UE configured for groupcast communication with members of a device group. The method comprises converting an application layer group identifier to an intermediate destination L2 identifier, hashing the intermediate destination L2 identifier value and a source L2 identifier to generate a cryptographic destination identifier and sending, to the device group, a groupcast message including the cryptographic destination identifier and the source identifier.

A seventeenth aspect of the disclosure comprises a UE configured for groupcast communication with members of a device group. The UE is configured to convert an application layer group identifier to an intermediate destination L2 identifier, hash the intermediate destination L2 identifier value and a source L2 identifier to generate a cryptographic destination identifier and send, to the device group, a groupcast message including the cryptographic destination identifier and the source identifier.

An eighteenth aspect of the disclosure comprises a UE configured for groupcast communication with members of a device group. The UE comprises an interface circuit configured for device-to-device communication over a sidelink, and processing circuitry configured to convert an application layer group identifier to an intermediate destination L2 identifier, hash the intermediate destination L2 identifier value and a source L2 identifier to generate a cryptographic destination identifier and send, to the device group, a groupcast message including the cryptographic destination identifier and the source identifier.

A nineteenth aspect of the disclosure comprises a computer program comprising executable instructions that, when executed by a processing circuit in a UE, causes the UE to perform the method according to the sixteenth aspect.

A twentieth of the disclosure comprises a carrier containing a computer program according to the fourth aspect, wherein the carrier is one of an electronic signal, optical signal, radio signal, or computer readable storage medium.

DETAILED DESCRIPTION

Figure 1:
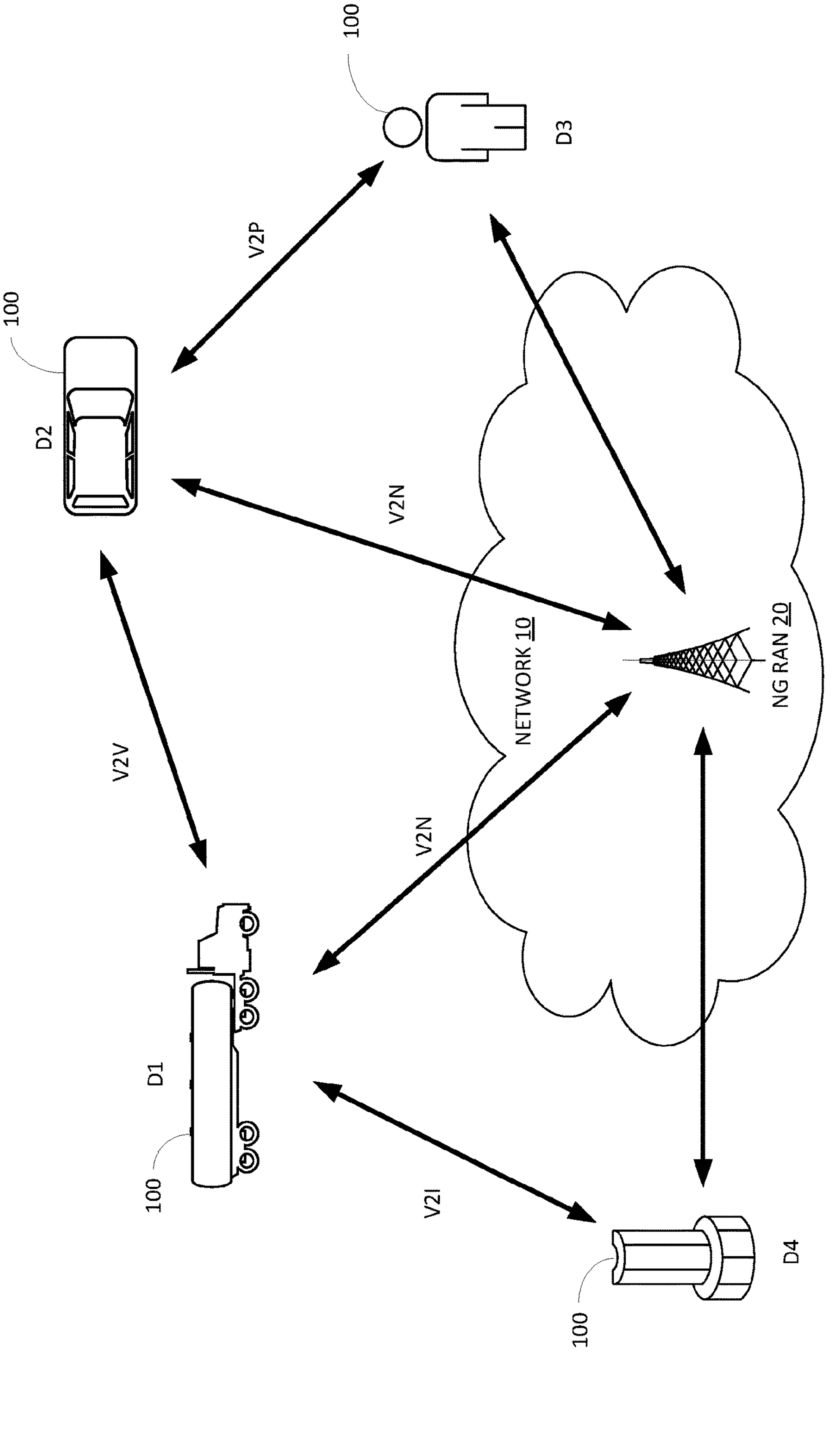
FIG. 1 illustrates an exemplary network supporting V2X communications.

Referring now to the drawings, an exemplary embodiment of the disclosure will be described in the context of a 5G or NR network. Those skilled in the art will appreciate that the methods and apparatus herein described are not limited to use in 5G or NR networks, but may also be used in other wireless communication networks supporting V2X communications.

FIG. 1 illustrates a wireless communication network 10 according to the NR standard supporting V2X communications. The wireless communication network 10 comprises a Next Generation Radio Access Network (NG RAN) 20 including one or more base stations 25 (FIG. 2) providing service to user equipment (UEs) 100 in respective cells of the wireless communication network 10. The base stations 25 are also referred to as Evolved NodesBs (eNBs) in LTE and as 5G NodeBs (gNBs) in NR. A base station 25 connected to a 5G Core (5GC) 30 and implementing LTE over the air interface is referred to as a next generation eNB (ng-eNB). Although only one cell and one base station 25 are shown in FIG. 1, those skilled in the art will appreciate that a typical wireless communication network 10 comprises many cells served by many base stations 25.

The UEs 100 may comprise any type of equipment capable of communicating with the base station 25 over a wireless communication channel. For example, the UEs 100 may comprise cellular telephones, smart phones, laptop computers, notebook computers, tablets, machine-to-machine (M2M) devices (also known as machine type communication (MTC) devices), embedded devices, wireless sensors, or other types of wireless end user devices capable of communicating over wireless communication networks 10.

FIG. 1 illustrates four UEs 100 denoted D1-D4 respectively. The UEs 100 are configured for D2D communication (e.g., V2X communication) over a sidelink (e.g. PC5 interface) and are also referred to herein as D2D devices or V2X devices. The UEs 100 may also be configured to communicate over the Uu interface. Devices D1 and D2 are carried onboard vehicles. Device D3 is mounted to some infrastructure (e.g., roadside sign). Device D4 comprises a cell phone or smart phone capable of D2D communication. In the example illustrated in FIG. 1, Device D1 is engaged in vehicle-to-vehicle (V2V) communication with Device D2 and vehicle-to-infrastructure (V2I) communication with Device D4. Device D2 is engaged in vehicle-to-vehicle (V2V) communication with Device D3 and vehicle-to-person (V2P) communication with Device D3. All four devices are capable of communication with the network 10 via base station 25.

Figure 2:
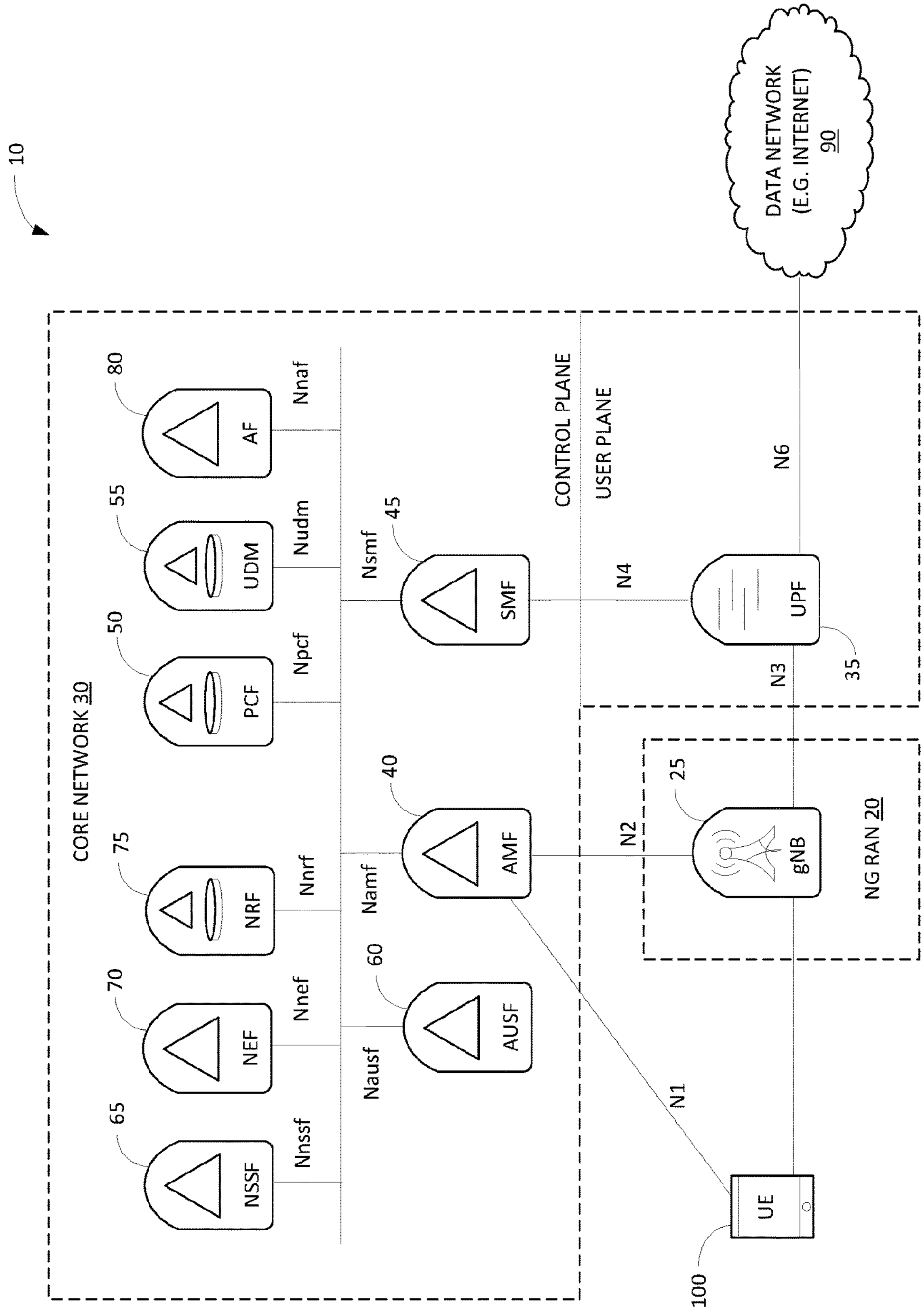
FIG. 2 illustrates a system architecture of a 5G network.

FIG. 2 illustrates the system architecture for a 5G network in more detail. The base stations 25 in the NG RAN 20 allow the UEs 100 to gain connectivity to the 5GC 30. The base stations 25 could be gNBs or ng-eNBs in 5G. The 5GC 30 contains Network Functions (NFs) providing a wide range of different functionalities such as session management, connection management, charging, authentication, etc. The % GC 30 includes a user plane and a control plane. A User Plane Function (UPF) 35 in the user plane provides connection to an external data network 90. In one exemplary embodiment, the NFs in the control plane include a an Access And Mobility Management Function (AMF) 40, a Session Management Function (SMF) 45, a Policy Control Function (PCF) 50, a Unified Data Management (UDM) function 55, a Authentication Server Function (AUSF) 60, a Network Slice Selection Function (NSSF) 65, a Network Exposure Function (NEF) 70, a Network Repository Function (NRF) 75 and one or more Application Functions (AFs) 80. These NFs comprise logical entities that reside in one or more core network nodes, which may be implemented by one or more processors, hardware, firmware, or a combination thereof. The various network functions may reside in a single core network node or may be distributed among two or more core network nodes. As another example, a network node may be a virtual network node as described in more detail below. In exemplary embodiments herein described, an AF 80 is configured as a V2X server to provide support for V2X services.

In conventional wireless communication network, the various NFs (e.g., SMF 45, AMF 40, etc.) in the 5GC 30 communicate with one another over predefined interfaces. In the service-based architecture shown in FIG. 1, instead of predefined interfaces between the control plane functions, the wireless communication network 10 uses a services model in which the NFs query the NRF 75 or other NF discovery node to discover and communicate with each other.

The communication links between the UE 100 and the network 10 can be grouped in two different strata. The UE 100 communicates with the 5GC 30 over the Non-Access Stratum (NAS), and with the NG RAN 20 over the Access Stratum (AS). All the NAS communication takes place between the UE and the AMF 40 in the 5GC 30 over the NAS protocol (N1 interface in FIG. 1). Protection of the communications over this these strata is provided by the NAS protocol for NAS messages and the Packet Data Conversion Protocol (PDCP) protocol for AS messages.

More details on the 5G security can be found in TS 33.501, but in general, the security mechanisms for these protocols rely on multiple different security keys. In the 5G security specification, these keys are organized in a hierarchy. At the top level there is the long-term key part of the authentication credential that is stored in the SIM card on the UE side and in the UDM 55 or Authentication Credential Repository and Processing Function (ARPF) of the home Public Land Mobile Network (PLMN).

A successful primary authentication run between the UE 100 and the AUSF 50 in the home PLMN leads to the establishment of the KAUSF key, which is the second level key in the key hierarchy. This key is not intended to leave the home PLMN and is used for new features introduced in the 5G System, such as for the provisioning of parameters to the UE 100 from the home PLMN. More precisely the KAUSF key is used for the integrity protection of the messages delivered from the home PLMN to the UE 100. As described in TS 33.501, such new features include the Steering of Roaming (SoR) and the UDM parameter delivery procedures.

The KAUSF key is in used to derive another key denoted KSEAF that is sent to the serving PLMN, also referred to as the visited PLMN. The serving PLMN key is then used to derive the subsequent NAS and AS protection keys. These lower level keys together with other security parameters such as the cryptographic algorithms, the UE security capabilities, the value of the counters used for replay protection in the different protocols, etc., constitute what is defined as the 5G security context in TS 33.501. It should be noted that KAUSF is not part of the 5G security context since 5G security context resides in the serving network.

Figure 3:
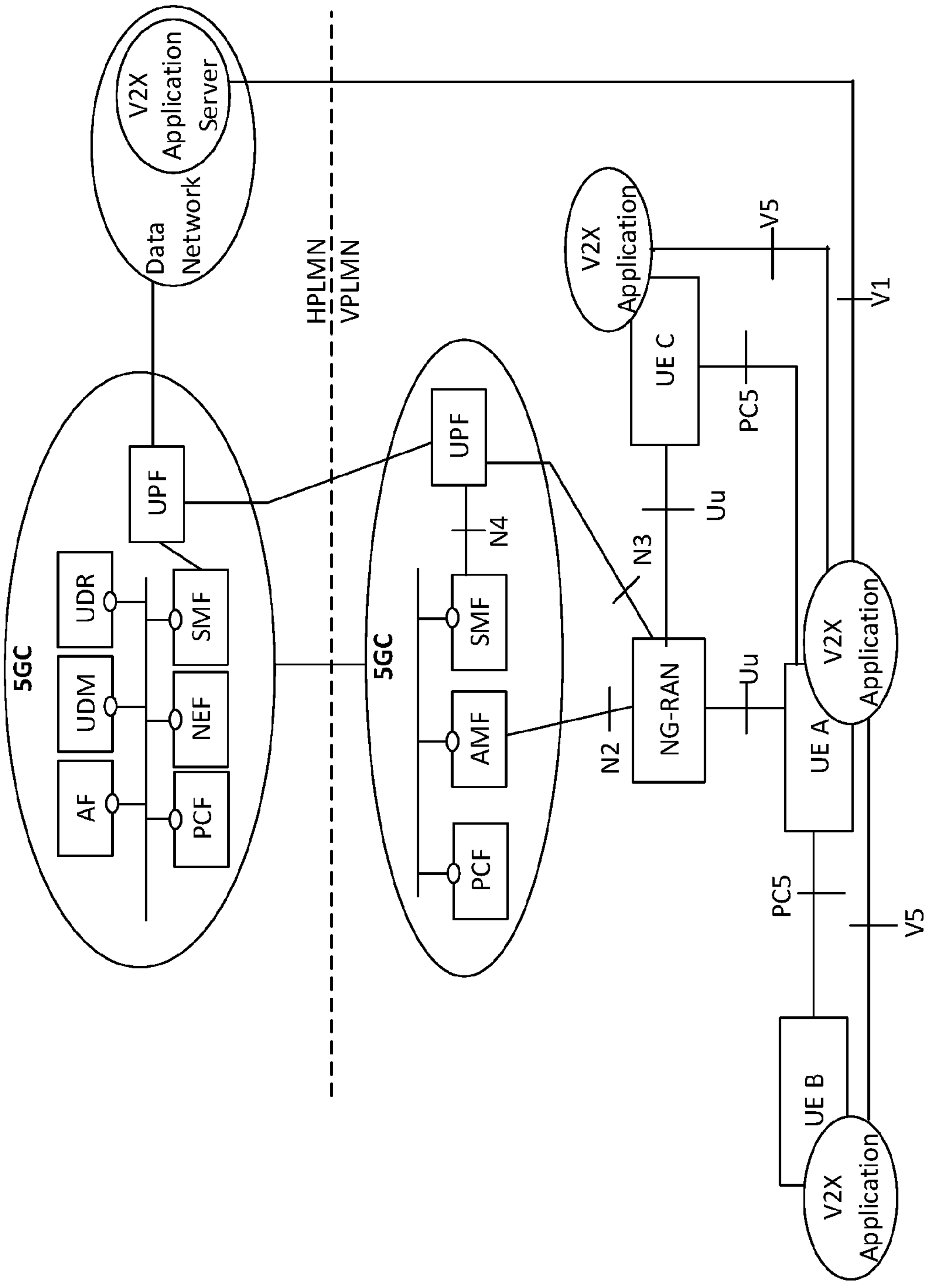
FIG. 3 illustrates system architecture for V2X communications.

The work on Release 16 for 5G is currently ongoing. This release is expected to deliver many new features, such as additional support for vehicular communication (e.g., V2X). The architecture work has been finalized by the architecture group SA2 and is described in TS 23.287. FIG. 3 shows the roaming architecture for V2X-capable UEs 100. As seen in FIG. 3, V2X applications hosted on or associated with the UEs 100 roaming in a visited Public Land Mobile Network (PLMN), denoted UE A-C in FIG. 3, communicate with other V2X applications over the V5 interface, and with a V2X server in the home in the home PLMN over the V1 interface.

Compared to the V2X architecture in EPS, the 5G architecture does not include a separate V2X control function in the core network. In the 5G architecture, the V2X control function role is endorsed by the PCF 50. More particularly, the provisioning of the necessary parameters for V2X communication to the UE 100, is done by the PCF 50 in the home network of the UE 100 using the policy delivery and modification procedures described in TS 23.502 and TS 23.503.

For V2X communication, two interfaces could be used. The UE 100 can use the usual Uu interface, i.e., air interface, between the UE 100 and the base station 25. The UE 100 can also use the PC5 interface, a.k.a. the sidelink, introduced during the development of the proximity service features for LTE in Release 14. Depending on the radio access technology (RAT) used, the sidelink can be LTE or NR-based. In contrast to the LTE-based PC5, the NR-based PC5 interface is extended to support not only broadcast communication, but also groupcast and unicast communication. In addition, for unicast communication, the NR-based PC5 interface will have separate control and user planes.

One aspect of the disclosure comprises security mechanisms to protect the L2 identifiers used in groupcast communications over the sidelink (e.g., PC5 interface). The exemplary security mechanisms described herein rely on the introduction of a new conversion function (ConvF) in order to generate destination L2 identifiers from application layer identifiers intended for use in groupcast communication. As described TS 23.287 § 5.6.1.3, the UE 100 applies the conversion when the application layer provides group identifier information to the lower layer.

The conversion function is yet to be specified by 3GPP. According to one aspect of the present disclosure, the security mechanism for protecting L2 identifiers introduces the use of a cryptographic function in the conversion process in order to make sure that the destination L2 identifier in groupcast messages pertaining to a specific group is not fixed, but instead, is randomly changed in order to mitigate against the linkability threat. The techniques as herein described are not dependent on how the conversion function will work but we still need to assume that it is deterministic in the sense that the conversion function generates the same output values whenever fed with the same input values. From another perspective, the security mechanism as herein described conceals the actual group-specific L2 identifier. Therefore, the L2 identifiers generated by the security mechanism can be referred to as pseudorandom identifiers.

Figure 4A:
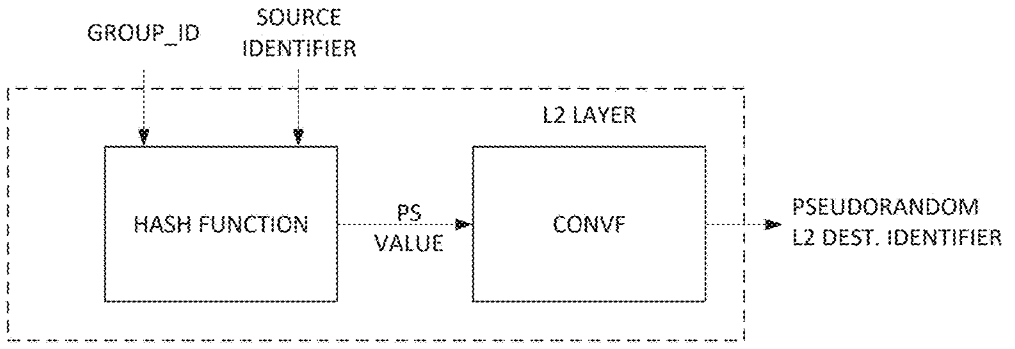
FIGS. 4A and 4B illustrate exemplary processes for generating a pseudorandom destination L2 identifier for groupcast messages.

FIG. 4A illustrates one example of a conversion process implemented by L2 for generating a pseudorandom destination L2 identifier. The group identifier information provided by the application, along with the source L2 identifier intended to be used in the groupcast message and possibly other information, is input to a hash function. The hash function applies a one-way hash algorithm to calculate a pseudorandom value based on the inputs. The hash function could be the Key Derivation Function (KDF) specified by the standards, an MD5 algorithm, or Secure Hash algorithm. The pseudorandom value output by the hash function can be considered as an intermediate destination L2 identifier. The pseudorandom value output by the hash function is fed to the conversion function in order to generate the final pseudorandom destination L2 identifier that is used in groupcast communications.

Figure 4B:
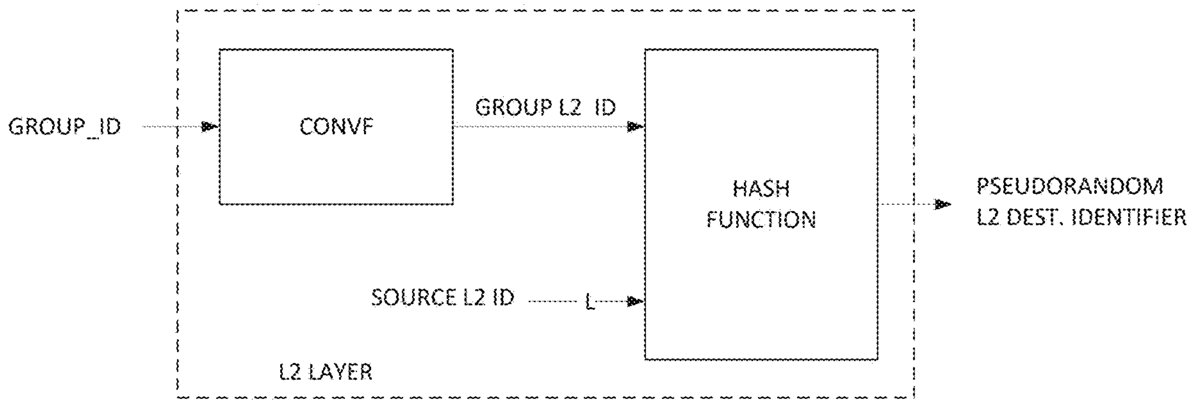

FIG. 4B illustrates a conversion process according to another embodiment. In this embodiment, the conversion function is applied to the group identifier information received from the application layer to produce a group L2 identifier, which may be considered as an intermediate destination L2 identifier. The group L2 identifier output by the conversion function is then fed to the hash function together with the source L2 identifier and possibly other information. The output of the hash function is then taken as the pseudorandom destination L2 identifier to be used in the groupcast communication.

In both embodiments, the pseudorandom destination L2 identifier is bound not only to the group identifier information but also to the source L2 identifier. Therefore, even though the group identifier is fixed, the pseudorandom destination L2 identifier will differ among the members of the same group. Additionally, assuming that the UE 100 uses the privacy mechanism described earlier to refresh the source L2 identifier, each change of the source L2 identifier will result in a change of the pseudorandom destination L2 identifier for any group in which the UE 100 is a member.

Figure 5:
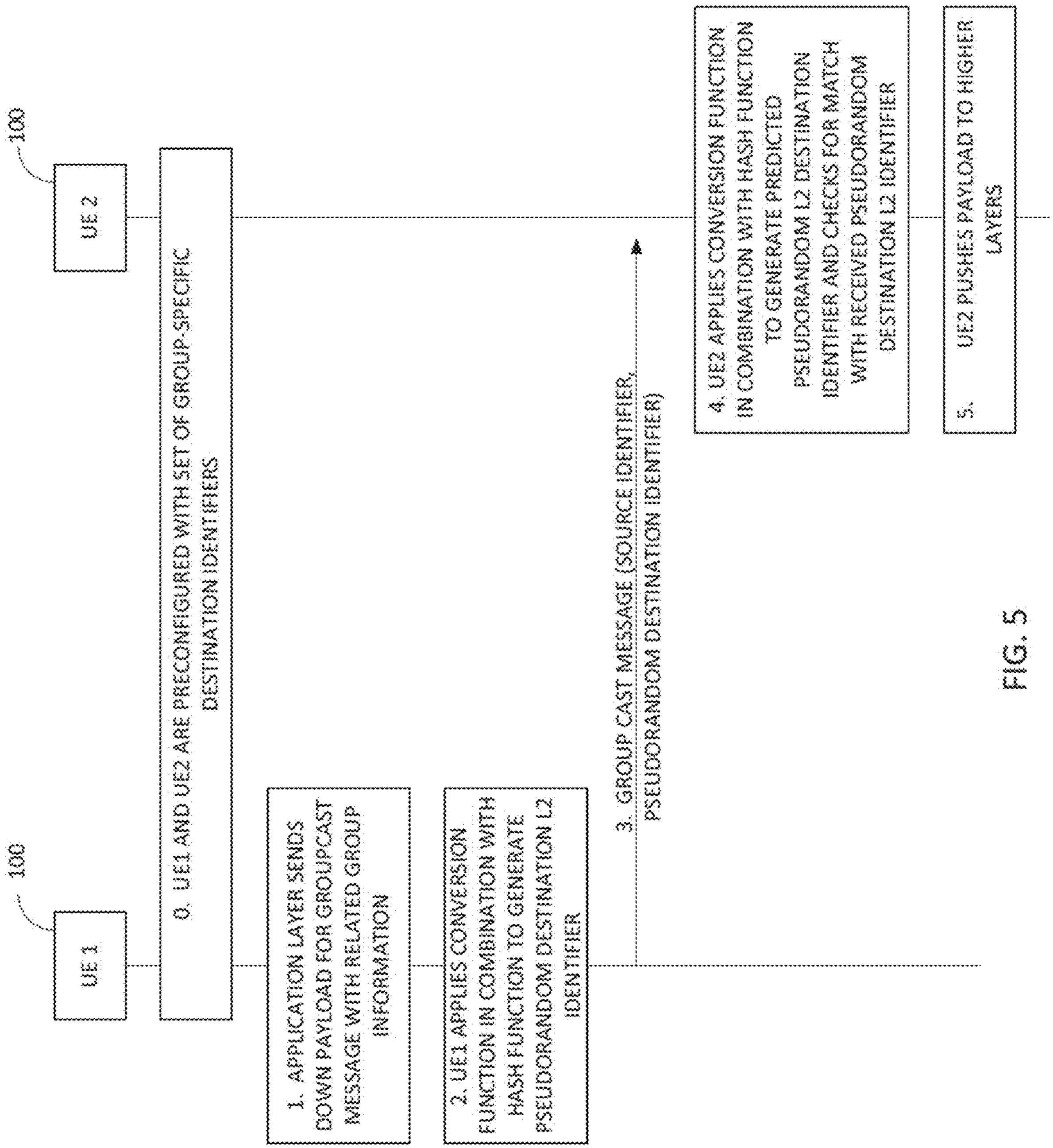
FIG. 5 is an example of groupcast communication between a sending device and a receiving device.

FIG. 5 illustrates signaling between two UEs 100 engaged in groupcast communication using pseudorandom destination L2 identifiers as herein described. It is assumed that the UEs 100 have been authorized for groupcast communication over the sidelink and have been provisioned with the necessary group information. The following describes one exemplary procedure for sending groupcast messages between a sending device (UE1) and a receiving device (UE 2).

1. At the sending device (UE 1), the application layer pushes down a payload intended for groupcast communication with the necessary group information. The group information may include an identifier of the target group.

2. UE1 applies the conversion function in combination with the hash function to generate a pseudorandom destination L2 identifier using its current source L2 identifier, the group identifier received from the upper layer and possibly other parameters. UE1 may use the process shown in FIG. 4A or FIG. 4B for this step.

3. UE1 builds the groupcast message using the pseudorandom destination L2 identifier of step 2 as the destination L2 identifier and transmits the groupcast message. The groupcast message includes, in addition to the pseudorandom destination L2 identifier, the current source L2 identifier used for the calculation of the destination L2 identifier as described in the previous step.

4. It is assumed that the lower layers on the receiving device (UE 2) have been configured with the necessary group information for all groups in which UE2 is a member. This is to avoid protocol layer violation during the processing of the received messages. Upon reception of a groupcast message, UE2 applies the conversion function in combination with the hash function using the source L2 identifier from the received message and a group identifier known a priori to generate an expected pseudorandom destination L2 identifier. The UE2 then checks if the expected pseudorandom destination L2 identifier matches the one received in the groupcast message. If UE2 is authorized for more than one group, UE2 may need to perform the check for each group until either a match is found, or no match is found for any of the groups.

5. If a match is found, the UE 100 pushes back the message to the application layer with an indication of the group targeted by the message. If no match is found, the message could be discarded or pushed upwards with an error indication, etc.

The security mechanism induces some processing overhead on the receiving device. The overhead increases with the number of groups the receiving device belongs to. In order to reduce this overhead, the application layer at the sending device could indicate whether to apply the privacy mechanism. This indication could be set only for privacy-sensitive groups. In this case, the sending device will only use the hashing function at step 2 when the indication is received, otherwise it will just apply the conversion without the use of hashing. On the receiving side, the receiving device (UE 2) can be configured to first check whether the received destination matches one of the preconfigured destinations for groups without privacy protection. If no match is found among the unprotected groups, and one or more protected groups exist, UE2 performs the check (step 4) as described above to determine whether the groupcast message is intended for a protected group in which UE2 is a member.

In another embodiment, the receiving device (UE2) first assumes the received groupcast message includes a pseudorandom destination L2 identifier and performs the check (step 4) with the exception that only the group identifiers for privacy sensitive groups are considered. If no match is found, UE2 applies the straight conversion of the received destination L2 identifier without hashing and pushes the message upwards or simply applies the default treatment.

The overhead can be further reduced by including an indication in the groupcast message itself to signal that the groupcast message is privacy-sensitive. The additional indication in the message could be a Boolean flag that is set in case the message is privacy sensitive and unset otherwise. In this embodiment, the receiving device (UE2) proceeds as follows:

If the privacy indication is included in the received message, UE2 performs the check (step 4) with the exception that it only considers privacy-sensitive groups.

If the privacy indication is not included, the UE2 applies the straight conversion without hashing and applies the default treatment.

Figure 6:
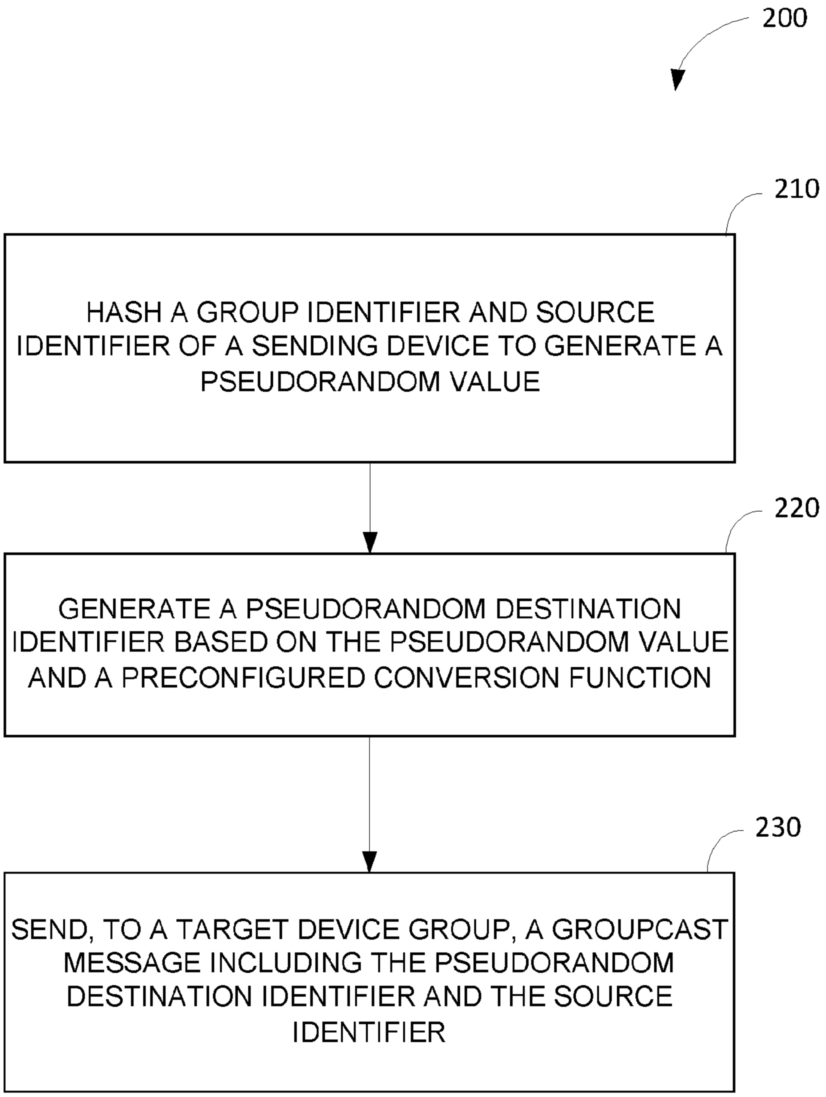
FIG. 6 illustrates an exemplary method of implemented by a UE of sending a groupcast message.

FIG. 6 illustrates an exemplary method 200 implemented by a UE 100 of sending a groupcast message to a target device group. The UE 100 hashes a group identifier and source L2 identifier of a source device to generate a pseudorandom value (210). The UE 100 further generates a pseudorandom destination L2 identifier based on the pseudorandom value and a preconfigured conversion function (220). The UE 100 finally sends a groupcast message targeted to the device group (230). The groupcast message includes the pseudorandom destination L2 identifier and the source L2 identifier.

In some embodiments of the method 200, the group identifier is an application layer group identifier. The UE 100 in this case generates the pseudorandom destination L2 identifier using the conversion function with the pseudorandom value as an input.

In some embodiments of the method 200, the group identifier is an intermediate destination L2 identifier. In this case, the UE 100 generates the intermediate destination L2 identifier using the conversion function with an application layer group identifier as an input and assigns the pseudorandom value output by the hash function to be the pseudorandom destination L2 identifier.

In some embodiments of the method 200, hashing a group identifier and source identifier of a sending device to generate a pseudorandom value and generating a pseudorandom destination identifier are performed responsive to determining that the device group is in a protected device group.

In some embodiments of the method 200, the groupcast message further includes an indication that the device group is a protected group.

Figure 7:
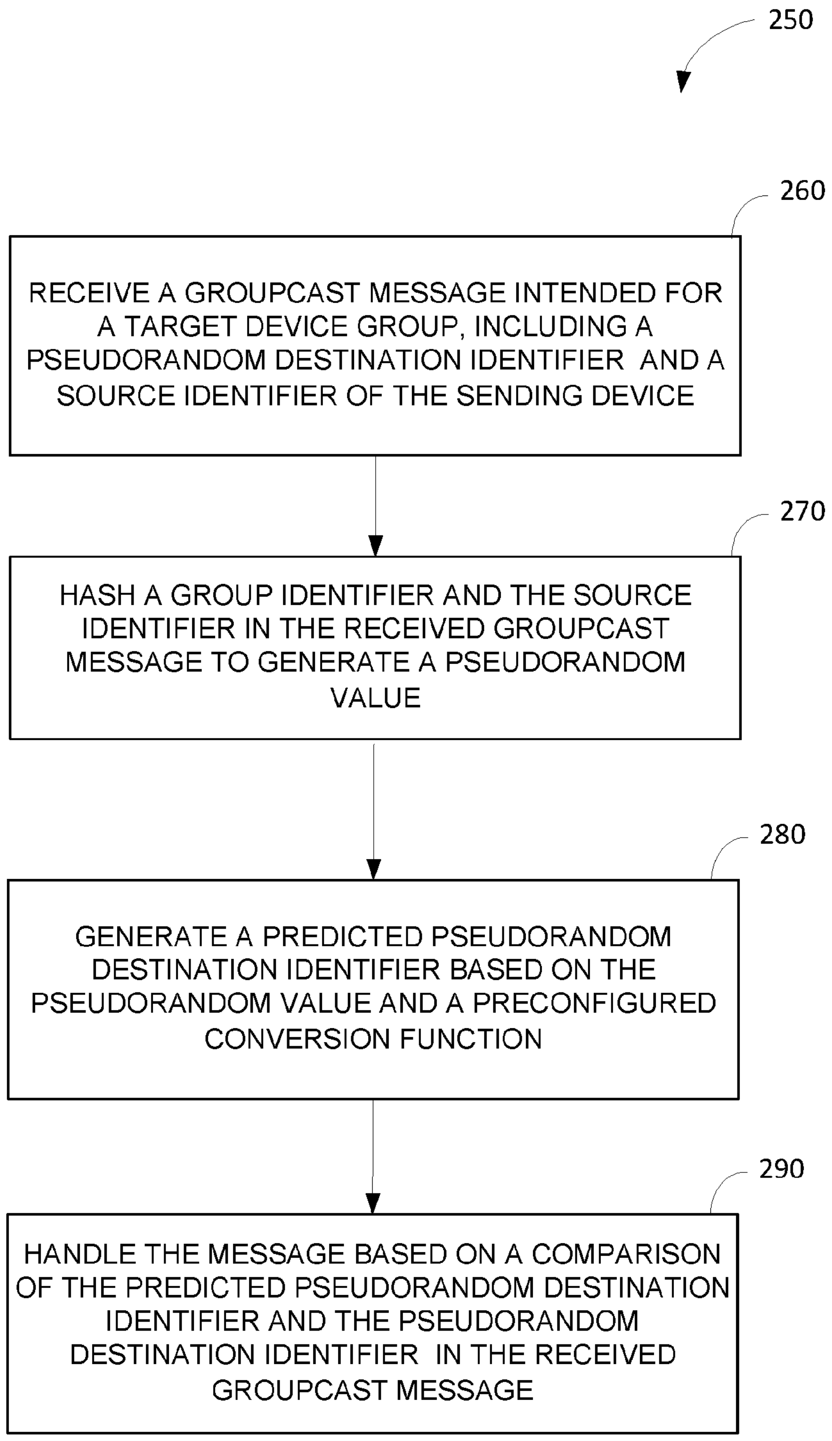
FIG. 7 illustrates an exemplary method implemented by a UE of receiving a groupcast message.

FIG. 7 illustrates an exemplary method 250 implemented by a UE 100 in a device group of receiving a groupcast message intended for a device group. The UE 100 receives a groupcast message intended for the device group (260). The group cast message includes a destination L2 identifier and a source L2 identifier of the sending device. The UE 100 hashes a group identifier and the source L2 identifier in the received groupcast message to generate a pseudorandom value (270). The UE 100 further generates a predicted pseudorandom destination L2 identifier based on the pseudorandom value and a preconfigured conversion function (280). The UE 100 handles the message based on a comparison of the predicted pseudorandom destination L2 identifier and the destination L2 identifier in the received groupcast message (290).

In some embodiments of the method 250, the group identifier is an application layer group identifier. The UE 100 in this case generates the predicted pseudorandom destination L2 identifier using the conversion function with the pseudorandom value as an input.

In some embodiments of the method 250, the group identifier is a group L2 identifier. In this case, the UE 100 generates the group L2 identifier using the conversion function with the application layer group identifier as an input and assigns the pseudorandom value output by the hash function to be the predicted pseudorandom destination L2 identifier.

Some embodiments of the method 250 further comprise comparing the destination identifier in the received groupcast message to one or more destination identifiers for unprotected groups, wherein the method is performed when the received destination identifier does not match any of the destination identifiers for the unprotected groups.

Some embodiments of the method 250 further comprise comparing the destination identifier in the received groupcast message to one or more destination identifiers for unprotected groups when the destination identifier in the received groupcast message does not match the predicted pseudorandom destination identifier.

In some embodiments of the method 250, the groupcast message further includes an indication that the device group is a protected device group and the method is performed responsive to the indication.

Figure 8:
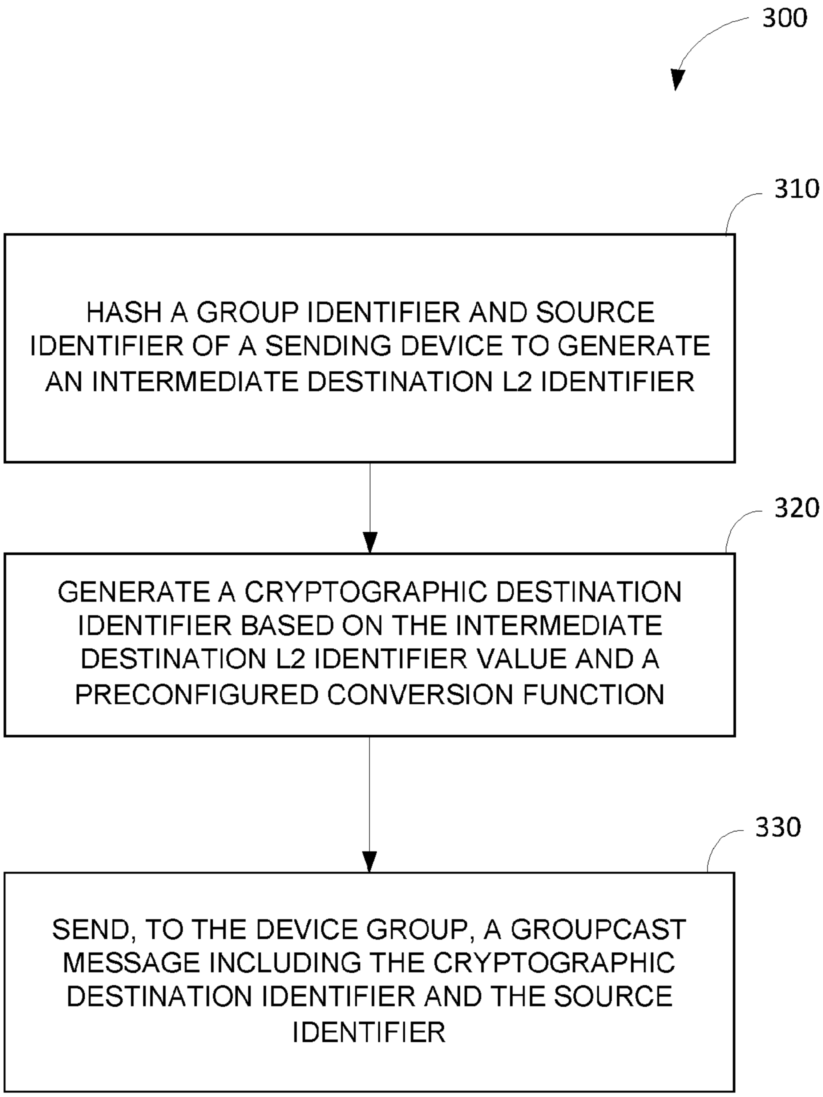
FIG. 8 illustrates an exemplary method of implemented by a UE of sending a groupcast message.

FIG. 8 illustrates an exemplary method 300 implemented by a UE 100 of sending a groupcast message to a target device group. The UE 100 hashes a group identifier and source identifier of a sending device to generate an intermediate destination L2 identifier (310). The UE 100 then generates a cryptographic destination identifier based on the intermediate destination L2 identifier value and a preconfigured conversion function (320). finally, the UE 100 sends, to the device group, a groupcast message including the cryptographic destination identifier and the source identifier (330).

In some embodiments of the method 300, hashing a group identifier and source identifier of a sending device to generate an intermediate destination L2 identifier and generating a cryptographic destination identifier are performed responsive to determining that the device group is a protected device group.

In some embodiments of the method 300, the groupcast message further includes an indication that the device group is a protected group.

Figure 9:
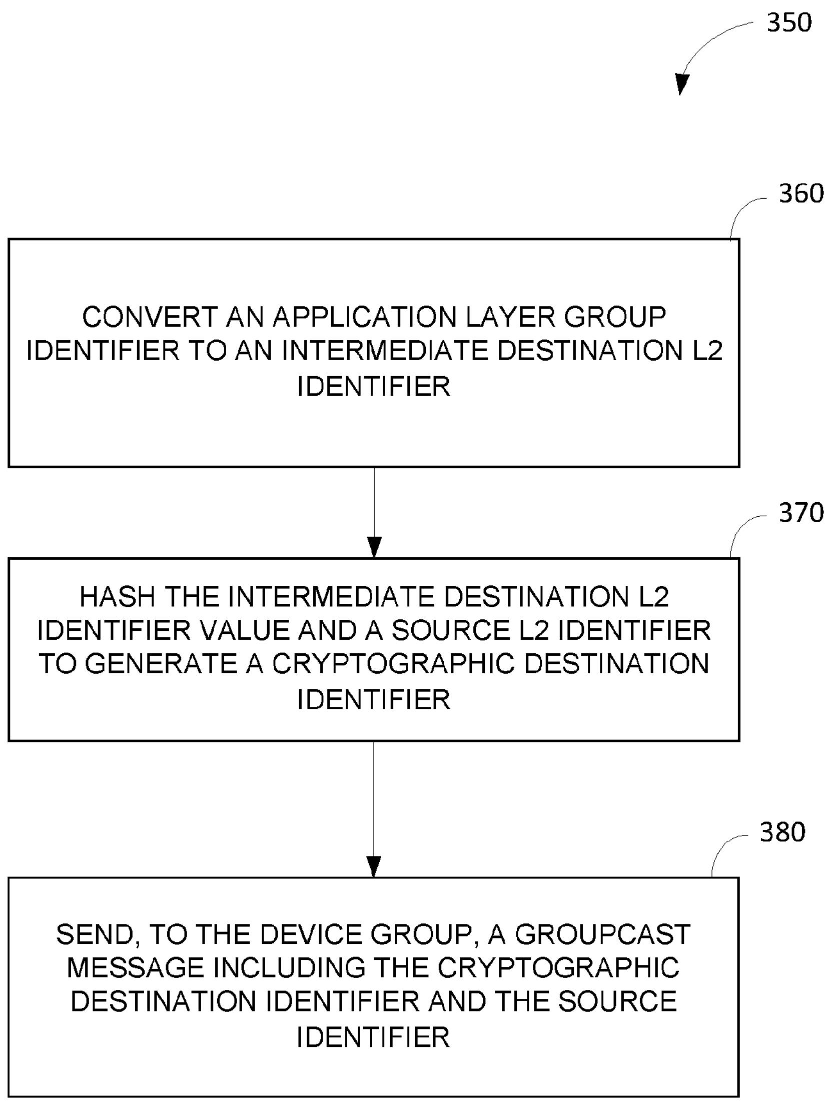
FIG. 9 illustrates an exemplary method of implemented by a UE of sending a groupcast message.

FIG. 9 illustrates an exemplary method 350 implemented by a UE 100 of sending a groupcast message to a target device group. The UE 100 converts an application layer group identifier to an intermediate destination L2 identifier (360). The UE 100 then hashes the intermediate destination L2 identifier value and a source L2 identifier to generate a cryptographic destination identifier (370). Finally, the UE 100 sends, to the device group, a groupcast message including the cryptographic destination identifier and the source identifier (380).

Some embodiments of the method 350 further comprise comparing the pseudorandom destination identifier in the received groupcast message to one or more destination identifiers for unprotected groups, and wherein the method is performed when the pseudorandom destination identifier does not match any of the destination identifiers for the unprotected groups.

Some embodiments of the method 350 further comprise comparing the pseudorandom destination identifier in the received groupcast message to one or more destination identifiers for unprotected groups when the pseudorandom destination identifier in the received groupcast message does not match the predicted pseudorandom destination identifier.

In some embodiments of the method 350, the groupcast message further includes an indication that the device group is a protected group, and wherein the method is performed responsive to the indication.

An apparatus can perform any of the methods herein described by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include Digital Signal Processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

In some embodiments, some or all of the functions described herein may be implemented as virtual components executed by one or more virtual machines implemented in one or more virtual environments hosted by one or more of hardware nodes. The functions may be implemented by one or more applications (which may alternatively be called software instances, virtual appliances, network functions, virtual nodes, virtual network functions, etc.) operative to implement some of the features, functions, and/or benefits of some of the embodiments disclosed herein. Applications are run in virtualization environment which provides hardware comprising processing circuitry and memory. Memory contains instructions executable by processing circuitry whereby application is operative to provide one or more of the features, benefits, and/or functions disclosed herein.

Figure 10:
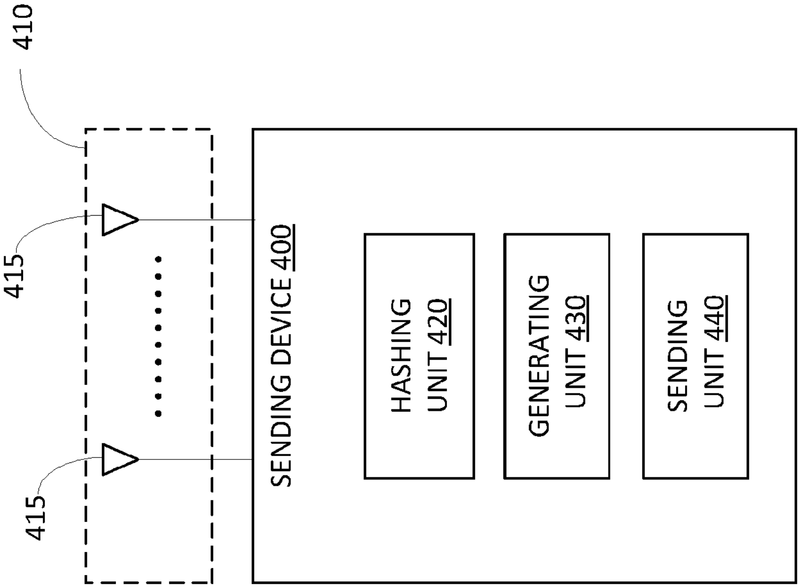
FIG. 10 illustrates an exemplary UE configured to send groupcast messages communications.

FIG. 10 illustrates an exemplary UE 400 configured to send a groupcast message as herein described. The UE 400 comprises an antenna array 410 with one or more antennas 415, a hashing unit 420, a generating unit 430 and a sending unit 440. The various units 420-440 can be implemented by hardware and/or by software code that is executed by one or more processors or processing circuits. The hashing unit 420 is configured to hash a group identifier and source L2 identifier of a source device to generate a pseudorandom value. The generating unit 430 is configured to generate a pseudorandom destination L2 identifier based on the pseudorandom value and a preconfigured conversion function. The sending unit 440 is configured to send. to the device group, a groupcast message including the pseudorandom destination L2 identifier and the source L2 identifier.

Figure 11:
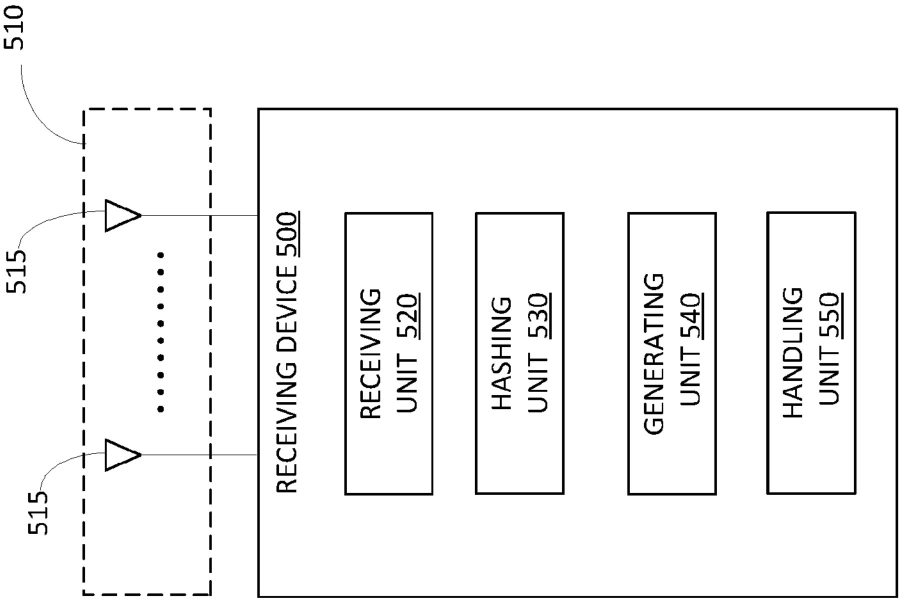
FIG. 11 illustrates an exemplary UE configured to receive groupcast messages.

FIG. 11 illustrates an exemplary UE 500 configured to receive a groupcast message intended for a target device group as herein described. The UE 500 comprises an antenna array 510 with one or more antennas 515, a receiving unit 520, a hashing unit 530, a generating unit 540, and a handling unit 550. The various units 520-550 can be implemented by hardware and/or by software code that is executed by one or more processors or processing circuits. The receiving unit 520 is configured to receive a groupcast message intended for the device group. The groupcast message includes a pseudorandom destination L2 identifier and a source L2 identifier of the sending device. The hashing unit 530 is configured to hash a group identifier and the source L2 identifier in the received groupcast message to generate a pseudorandom value. The generating unit 540 is configured to a predicted pseudorandom destination L2 identifier based on the pseudorandom value and a preconfigured conversion function. The handling unit 550 is configured to handle the message based on a comparison of the predicted pseudorandom destination L2 identifier and the pseudorandom destination L2 identifier the received groupcast message.

Figure 12:
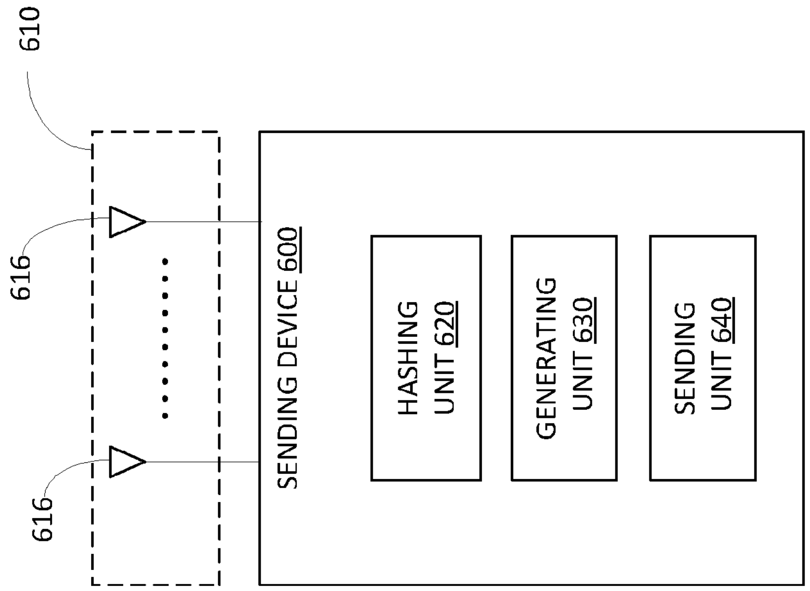
FIG. 12 illustrates an exemplary UE configured to send groupcast messages communications.

FIG. 12 illustrates an exemplary UE 600 configured to send a groupcast message as herein described. The UE 600 comprises an antenna array 610 with one or more antennas 616, a hashing unit 620, a generating unit 630 and a sending unit 660. The various units 620-660 can be implemented by hardware and/or by software code that is executed by one or more processors or processing circuits. The hashing unit 620 is configured to a hash a group identifier and source identifier of a sending device to generate an intermediate destination L2 identifier. The generating unit 630 is configured to generate a cryptographic destination identifier based on the intermediate destination L2 identifier value and a preconfigured conversion function. The sending unit 660 is configured to send to the device group, a groupcast message including the cryptographic destination identifier and the source L2 identifier.

Figure 13:
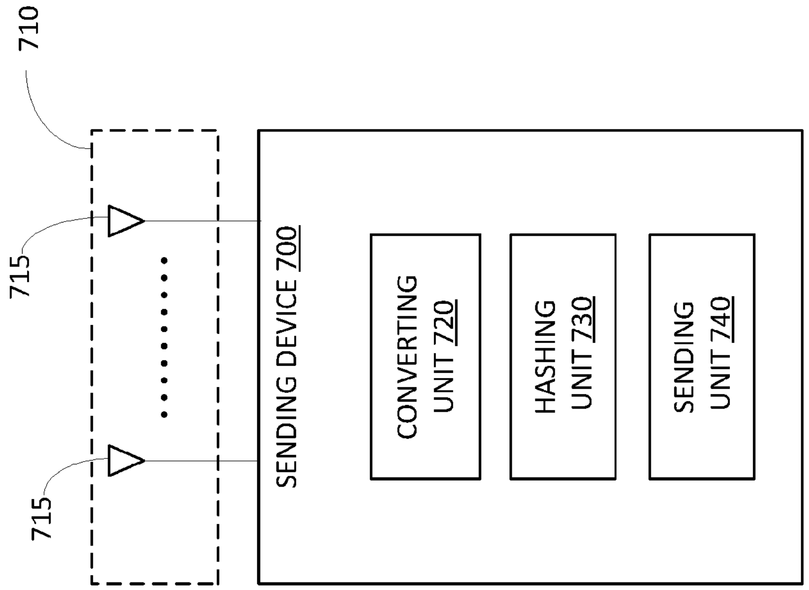
FIG. 13 illustrates an exemplary UE configured to send groupcast messages communications.

FIG. 13 illustrates an exemplary UE 700 configured to send a groupcast message as herein described. The UE 700 comprises an antenna array 710 with one or more antennas 715, a converting unit 720, a hashing unit 730 and a sending unit 740. The various units 720-740 can be implemented by hardware and/or by software code that is executed by one or more processors or processing circuits. The converting unit 720 is configured to convert an application layer group identifier to an intermediate destination L2 identifier. The hashing unit 730 is configured to hash the intermediate destination L2 identifier value and a source L2 identifier to generate a cryptographic destination identifier. the sending unit 740 is configured to send, to the device group, a groupcast message including the cryptographic destination identifier and the source identifier.

Figure 14:
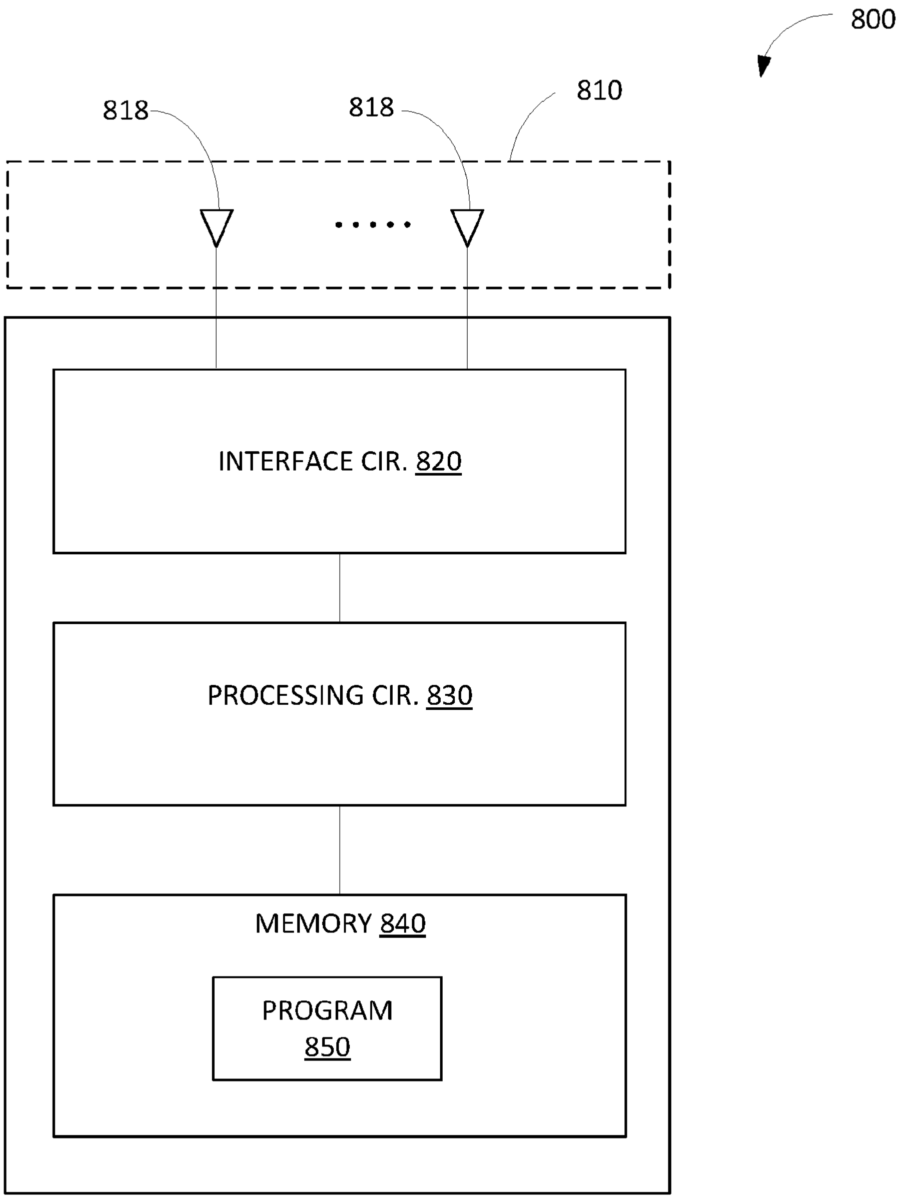
FIG. 14 illustrates an exemplary UE device configured for groupcast communication.

FIG. 14 illustrates an exemplary UE 800 configured to send and/or receive groupcast messages as herein described. The UE 800 comprises an antenna array 810 with multiple antenna elements 815, an interface circuit 820, a processing circuitry 830, and memory 840.

The interface circuit 820 is coupled to the antennas 815 and comprises the radio frequency (RF) circuitry needed for transmitting and receiving signals over a wireless communication channel. In one embodiment, the interface circuit 820 comprises a transceiver configured to operate according to the NR standard and is capable of D2D communication (e.g., V2X) over the sidelink (e.g., PC5 interface).

The processing circuitry 830 controls the overall operation of the radio node 800 and processes the signals transmitted to or received by the radio node 800. Such processing includes coding and modulation of transmitted data signals, and the demodulation and decoding of received data signals. The processing circuitry 830 may comprise one or more microprocessors, hardware, firmware, or a combination thereof. The processing circuitry 830 is configured to perform the methods as herein described.

Memory 840 comprises both volatile and non-volatile memory for storing computer program code and data needed by the processing circuitry 830 for operation. Memory 840 may comprise any tangible, non-transitory computer-readable storage medium for storing data including electronic, magnetic, optical, electromagnetic, or semiconductor data storage. Memory 840 stores a computer program 850 comprising executable instructions that configure the processing circuitry 830 to implement the methods 200 and/or 280 as described herein. A computer program 850 in this regard may comprise one or more code modules corresponding to the means or units described above. In general, computer program instructions and configuration information are stored in a non-volatile memory, such as a ROM, erasable programmable read only memory (EPROM) or flash memory. Temporary data generated during operation may be stored in a volatile memory, such as a random access memory (RAM). In some embodiments, computer program 850 for configuring the processing circuitry 830 as herein described may be stored in a removable memory, such as a portable compact disc, portable digital video disc, or other removable media. The computer program 850 may also be embodied in a carrier such as an electronic signal, optical signal, radio signal, or computer readable storage medium.

Those skilled in the art will also appreciate that embodiments herein further include corresponding computer programs. A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

The security mechanism for concealing group identifier as herein described does not require additional signaling or inclusion of additional parameters in existing signaling messages. The security protocol mitigates against the UE tracking threat when engaging in groupcast communication. The security protocol reuses the legacy mechanism for source L2 Identifier privacy protection, while, providing cryptographic-level strength in the sense that the attacker needs to break a cryptographic function in order to undermine the protection mechanism.

What is claimed is:

1. A method of sending a groupcast communication to members of a device group, wherein the method is implemented by a user equipment (UE) and the method comprises:

hashing a group identifier for the device group and a source identifier of a sending device together to generate a pseudorandom value;

generating a concealed destination identifier for the device group based on the pseudorandom value and a preconfigured conversion function, wherein the concealed destination identifier is cryptographically bound to both the group identifier and the source identifier; and sending a groupcast message targeted to the device group, the groupcast message including the source identifier as a source layer 2 (L2) identifier and the concealed destination identifier as a destination L2 identifier to prevent tracking of group members based on the destination L2 identifier.

2. The method of claim 1, wherein the group identifier is an application layer group identifier.

3. The method of claim 2, wherein the generating the concealed destination identifier comprises generating the concealed destination identifier using the conversion function with the pseudorandom value as an input.

4. The method of claim 1, wherein the group identifier is a group Layer 2 (L2) identifier.

5. The method of claim 4, wherein the generating the concealed destination identifier comprises generating the group L2 identifier using the conversion function with an application layer group identifier as an input.

6. The method of claim 1, wherein hashing the group identifier and source identifier and generating the concealed destination identifier are performed responsive to determining that the device group is a protected device group.

7. The method of claim 1, wherein the groupcast message further includes an indication that the device group is a protected group.

8. A method of receiving a groupcast communication from members of a device group, wherein the method is implemented by a user equipment (UE) and the method comprises:

receiving a groupcast message intended for the device group, the groupcast message including a source identifier of the sending device as a source layer 2 (L2) identifier and a concealed destination identifier as a destination L2 identifier to prevent tracking of group members based on the destination L2 identifier, wherein the concealed destination identifier is cryptographically bound to both a group identifier for the device group and the source identifier;

hashing the group identifier and the source identifier in the received groupcast message to generate a pseudorandom value;

generating a predicted destination identifier based on the pseudorandom value and a preconfigured conversion function; and forwarding the message responsive to the predicted destination identifier and the concealed destination identifier matching.

9. The method of claim 8, wherein the group identifier is an application layer group identifier.

10. The method of claim 9, wherein the generating the predicted destination identifier comprises generating the predicted destination identifier using the conversion function with the pseudorandom value as an input.

11. The method of claim 8, wherein the group identifier is a group Layer 2 (L2) identifier.

12. The method of claim 11, wherein the generating the predicted destination identifier comprises generating the group L2 identifier using the conversion function with an application layer group identifier as an input.

13. The method of claim 8:

wherein the method comprises comparing the concealed destination identifier in the received groupcast message to one or more destination identifiers for unprotected groups; and wherein the method is performed when the concealed destination identifier does not match any of the destination identifiers for the unprotected groups.

14. The method of claim 8, wherein the method comprises comparing the concealed destination identifier in the received groupcast message to one or more destination identifiers for unprotected groups when the concealed destination identifier in the received groupcast message does not match the predicted destination identifier.

15. The method of claim 8, wherein the hashing is performed responsive to the groupcast message indicating that it includes the concealed destination identifier.

16. A user equipment (UE) configured to send a groupcast communication to a device group, the UE comprising:

an interface circuit configured for device-to-device communication over a sidelink; and processing circuitry configured to:

hash a group identifier for the device group and a source identifier of a sending device together to generate a pseudorandom value;

generate a concealed destination identifier for the device group based on the pseudorandom value and a preconfigured conversion function, wherein the concealed destination identifier is cryptographically bound to both the group identifier and the source identifier; and send a groupcast message targeted to the device group, the groupcast message including the source identifier as a source layer 2 (L2) identifier and the concealed destination identifier as a destination L2 identifier to prevent tracking of group members based on the destination L2 identifier.

17. The UE of claim 16, wherein the group identifier is an application layer group identifier.

18. The UE of claim 17, wherein the processing circuitry is configured to generate the concealed destination identifier by generating the concealed destination identifier using the conversion function with the pseudorandom value as an input.

19. The UE of claim 16, wherein the group identifier is a group Layer 2 (L2) identifier.

20. The UE of claim 19, wherein the processing circuitry is configured to generate the concealed destination identifier by generating the group L2 identifier using the conversion function with an application layer group identifier as an input.

* * * * *